United States Patent

[11] 3,592,968

[72] Inventors Kenzo Ogawa;
Akihiko Suemitsu, both of Tokyo, Japan
[21] Appl. No. 841,297
[22] Filed July 14, 1969
[45] Patented July 13, 1971
[73] Assignee Tokyo Shibaura Electric Co., Ltd.
Kawasaki-shi, Japan
[32] Priority July 17, 1968
[33] Japan
[31] 43/49945

[54] AUTOMATIC TELEPHONE ANSWERING SYSTEM WITH A FAIL SAFE ARRANGEMENT
13 Claims, 15 Drawing Figs.

[52] U.S. Cl. 179/6 R
[51] Int. Cl. H04m 1/64
[50] Field of Search 179/6, 6 AC, 6 C, 6 R, 100.2 CA, 100.2 M, 100.2 S

[56] References Cited

UNITED STATES PATENTS 2,937,237 5/1960 Zanardo ........ 179/6

FOREIGN PATENTS 901,173 7/1962 Great Britain ........ 179/6

*Primary Examiner*—Bernard Konick
*Assistant Examiner*—Raymond F. Cardillo, Jr.
*Attorney*—George B. Oujevolk

ABSTRACT: An automatic telephone answering apparatus for an absent subscriber having a receiving circuit for detecting transmitted signals, a magnetic recording and reproducing device having an endless magnetic recording tape provided with a first and second rotation indicator, and a control device composed of a first and second detectors for detecting the rotation of the tape using the first and second indicator. The apparatus also includes a control circuit for causing the magnetic recording and reproducing device to operate in the absence of the subscriber.

AUTOMATIC TELEPHONE ANSWERING SYSTEM WITH A FAIL SAFE ARRANGEMENT

BACKGROUND OF THE INVENTION

The present invention relates to an automatic telephone answering apparatus for an absent subscriber which makes an automatic recorded response to a caller who can then give information by telephone and also automatically records the information so provided.

Heretofore, there have been proposed various devices suitable for use as an automatic telephone answering apparatus. However, these devices of the prior art had a complicated and large scale arrangements and were not always satisfactory in operating reliability.

SUMMARY OF THE INVENTION

It is accordingly the object of the present invention to provide a very reliable automatic telephone answering apparatus for an absent subscriber which is of simple arrangement and free from erroneous action and automatically takes required countermeasures even when a recording tape is broken or a power source is turned off.

The present invention provides an automatic response apparatus for an absent subscriber which comprises a receiving circuit connected to a telephone line for detecting received signals; a magnetic recording and reproducing device formed of a movable magnetic head for writing, a fixed magnetic head for reading out and an endless magnetic recording tape provided with a first and second rotation indicator for detecting the rotation of the endless tape; and a control device composed of a first and second detector which are so disposed as to face the aforesaid first and second rotation indicators respectively once in each rotation of the tape and a control circuit which, when the second indicator faces the second detector, allows the apparatus to be in a waiting condition, and, when there are signals actually received, causes the endless tape to begin rotation to read out by use of the fixed head the recorded reply previously recorded, and, when the tape completes one rotation, allows the apparatus to be in a writing condition, and at the following rotation of the endless tape writes the caller's information therein by use of the movable head.

DESCRIPTION OF THE PREFERRED EMBODIMENTS

Figure 1:
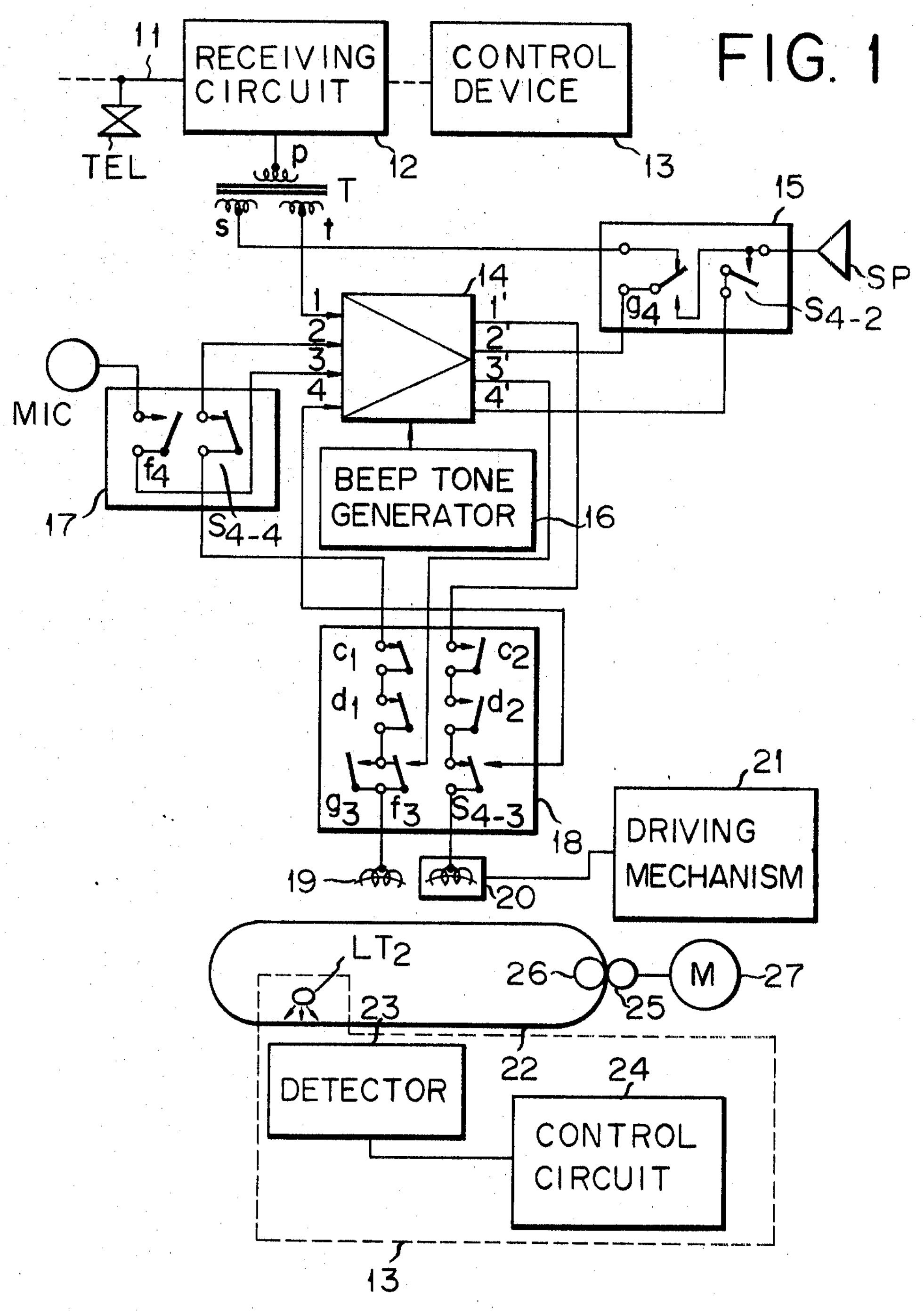
FIG. 1 illustrates the arrangement of an embodiment of the present invention.

There will now be described an embodiment of the present invention by reference to the appended drawings. Referring to FIG. 1, there are connected to a telephone line 11 a subscriber's telephone apparatus TEL and the receiving circuit 12 of an automatic telephone answering apparatus in parallel thereto. This receiving circuit 12 allows a control device 13 to automatically start its operation. Ad described later, the control device 13 constitutes the nucleus of the present invention. The secondary winding *s* of a transformer T connected to the receiving circuit 12 is supplied with response signals when a caller makes a call and the tertiary winding *t* thereof picks up said caller's information. These windings *s* and *t* are connected to an amplifier 14, to which there are connected through switching circuits 15, 17 and 18 a speaker SP, microphone MIC, fixed magnetic head 19 and movable magnetic head 20. The switching circuits 15, 17 and 18 are switched by the relay or switch of the control circuit 13. To the amplifier 14 is also connected a beep tone generator 16, said beep tone being used in indicating the end of the message. A movable magnetic head 20 selects any of a plurality of tracks formed in an endless magnetic tape 22 by means of a movable mechanism 21 under the control of the control device 13. A part of the endless magnetic tape 22 is held between a pair of rotating rollers 25 and 26. One of the rollers 25 is coupled with a tape driving mechanism 27 such as a motor M. As described later, the magnetic tape 22 is provided with a rotation indicator to detect its rotation. On the inside of the rotating magnetic tape 22 is disposed a light source $LT_2$, and upon receipt of light beams from said light source $LT_2$, a detector 23 such as a phototransistor operates in response to the rotation indicator. Said phototransistor allows the control circuit 24 of the control device 13 to form control information.

Figure 2:
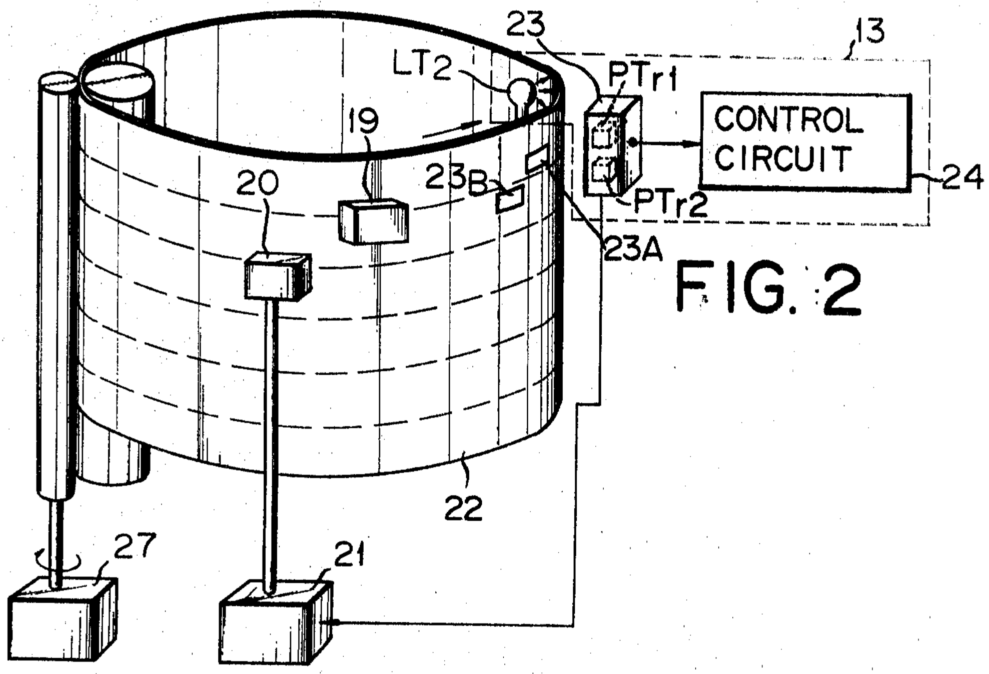
FIG. 2 shows a perspective view for the explanation of the operation of the endless magnetic tape consisting of a plurality of tracks and magnetic heads shown in FIG. 1.

FIG. 2 shows the operation of the endless magnetic tape 22 and magnetic heads 19 and 20 of FIG. 1. The endless magnetic tape 22 comprises a plurality of tracks as shown. In the first track of said tape 22 is recorded the message. The recording and reproduction of the first track is carried out by the fixed magnetic head 19. The driving mechanism 21 of the movable magnetic head 20 is controlled according as the phototransistors $PT_1$ and $Pt_2$ corresponding to the first and second rotation indicators 23A and 23B are turned on or off. The first and second rotation indicators 23A and 23B are windows formed of a transparent material incorporated in the endless tape and disposed at a prescribed space.

Figure 3:
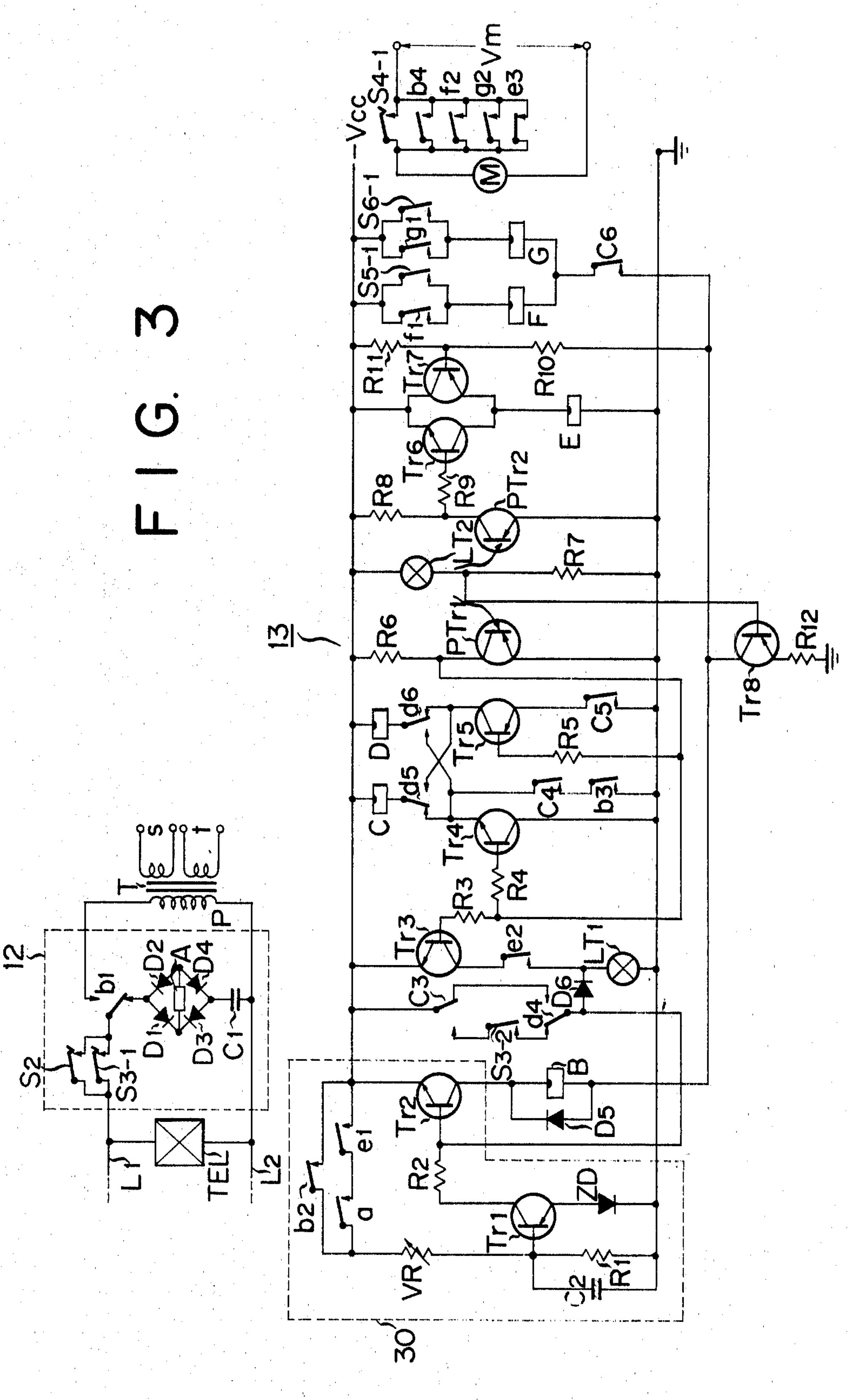
FIG. 3 is a circuit diagram of the control device of the automatic response telephone apparatus of FIG. 1 constituting the main part of the present invention.

FIG. 3 is a detailed diagram of the control device 13 of FIG. 1. This control device 13 automatically starts and stops the automatic telephone answering apparatus and additionally has a function of automatically taking remedial measures in case there occur abnormalities in the telephone apparatus such as the breaking of the tape, its improper position and the failure of a power source. There will now be described the control device 13 of FIG. 3 following the order in which the various elements are arranged. Between telephone lines $L_1$ and $L_2$ is connected a subscriber's telephone circuit TEL, which can act in exactly the same way as an ordinary subscriber's telephone, when it is not provided with automatic response means. Parallel to the absent called telephone circuit TEL is connected a receiving circuit 12, which is energized upon receipt of signals from a caller to start the apparatus. From the telephone line $L_1$, there is connected a parallel assembly of a switch $S_2$ for setting the message recording telephone apparatus and a switch $S_{3\text{-}1}$ for exclusive use in giving notice of the subscriber's absence through the contact $b_2$ of a B relay or a master relay to a bridge assembly of four diodes $D_1$, $D_2$, $D_3$ and $D_4$ having the indicated polarities for full wave rectification. The diode bridge is connected to a DC relay, i.e. to relay A, and further also to the telephone line $L_2$ through a condenser $C_1$. Between the contact $b_1$ of the B relay and telephone line $L_2$ is disposed a transformer T. The timer circuit arrangement 30 started by the A relay of the receiving circuit 12 is a novel circuit device developed by the present invention. This timer circuit arrangement 30 comprises a parallel circuit involving a transistor $Tr_1$, resistor $R_1$ and condenser $C_2$ connected between the base of the transistor $Tr_1$ and the ground of the transistor $Tr_1$, constant voltage Zener ZD connected between the emitter of the transistor $Tr_1$ and the earth. The Zener voltage of the diode ZD is used for the reference voltage of the timer circuit. The following transistor $Tr_2$ is connected to the base of the transistor $Tr_1$ through a variable resistor VR, the respective contacts of *a* and $e_1$ of the A and E relays, and the self-holding contact $b_2$ of the B relay connected parallel to these contacts *a* and $e_1$. To the collector of the transistor $Tr_2$ is connected one terminal of the B relay for controlling the operation of the tape driving mechanism 27 such as a motor M. The other terminal of B relay is connected to the collector of a transistor $Tr_8$. Between the base of the transistor $Tr_2$ and the collector of the transistor $Tr_1$ is interposed a resistor $R_2$. The base of the transistor $Tr_2$ is connected to a power source $-Vcc$ through the contact $d_4$ of the D relay, a switch $S_{3\text{-}2}$ for using the apparatus for the purpose of giving the absent called subscriber's message and the contact $c_3$ of the C relay, and also to the earth through a diode $D_6$ and an indication lamp $LT_1$. This indication lamp $LT_1$ indicates the occurrence of abnormalities such as the breaking of the tape or its improper position. The lamp is lighted when the contact $e_2$ of the E relay or the setting relay is operated to turn on a transistor $Tr_3$. The operation of the transistors $Tr_3$, $Tr_4$ and $Tr_5$ is controlled by the first detector or phototransistor $PTr_1$ corresponding to the first rotation indicator 23A of FIG. 2. The transistors $T_4$ and $Tr_5$ respectively enable the C and D relays or the control relay, to be operated. These C and D relays are slow release types.

The base voltage of the transistors $Tr_3$, $Tr_4$ and $Tr_5$ is supplied from the collector of the phototransistor $PTr_1$ through resistors $R_3$, $R_4$ and $R_5$ respectively. A resistor $R_6$ is interposed between the collector of the phototransistor $PTr_1$ and the power source $-Vcc$. The second detector or phototransistor $PTr_2$ corresponding to the second rotation indicator 23B of FIG. 2 is turned on when the automatic response telephone apparatus is in a waiting condition and also operates when the power source is momentarily cut off, so as to drive the E relay. A light source $LT_2$ is intended to energize the first and second phototransistors $PTr_1$ and $PTr_2$, and to an intermediate contact between the light source $LT_2$ and resistor $R_7$ is connected the base of the transistor $Tr_8$. The E relay is connected between a parallel circuit of an NPN type transistor $Tr_6$ and PNP type transistor $Tr_7$ and the earth. The base of the transistor $Tr_6$ is supplied by the power source $-Vcc$ with a base bias voltage through serially arranged resistors $R_8$ and $R_9$. The intermediate contact of these resistors $R_8$ and $R_9$ is connected to the collector of the emitter-grounded type phototransistor $PTr_2$. The base of the transistor $Tr_7$ is connected to the power source $-Vcc$ through a resistor $R_{11}$ and further to the collector of the transistor $Tr_8$ through a resistor $R_{10}$. The collector of the transistor $Tr_8$ is connected to the contact $c_6$ of the C relay, and between said contact $c_6$ and power source $-Vcc$ are serially connected the F relay and a recording switch $S_{5\text{-}1}$ and parallel to the recording switch $S_{5\text{-}1}$ is connected the self-holding contact $f_1$ of the F relay. Parallel to a circuit consisting of the F relay, recording switch $S_{5\text{-}1}$ and self-holding contact $f_1$ is connected a circuit having a similar arrangement thereto, namely, comprising the G relay, monitoring switch $S_{6\text{-}1}$ and self-holding contact $g_1$. Between the emitter and ground of the protective transistor $Tr_8$ is connected a resistor $R_{12}$. The F relay drives the motor M when there is recorded the absent called subscriber's message in the first track of the endless magnetic tape and is actuated by the closing of the recording switch. The contact $f_2$ of the F relay is closed to drive the motor M. With the self-holding contact $f_1$ kept closed, the endless magnetic tape continues rotation. When light beams from the light source $LT_2$ are projected on the first phototransistor $PTr_1$ through the first rotation indicator 23A, then the C relay is energized to open its contact $c_6$ and the holding of the F relay is released to stop the motor M. The G relay which acts like the F relay monitors the absent subscriber's message recorded in the first track of the endless magnetic tape. Said G relay is energized by the monitoring switch $S_{6\text{-}1}$ and kept held at its self-holding contact $g_1$ and released from said holding by the contact $c_6$ of the C relay. The recording switch $S_{5\text{-}1}$ and monitoring switch $S_{6\text{-}1}$ for starting the F and G relays respectively are of nonlock type. Contact between the magnetic tape driving motor M and the power source $Vm$ is controlled by the make contacts, that is, the contacts $b_4$, $f_2$ and $g_2$ of the B, F and G relays respectively, the break contact, namely the contact $e_3$ of the E relay and the reproducing switch $S_{4\text{-}1}$ consisting of a locking switch. The power source $Vm$ for said motor M or those for other members of the automatic response telephone apparatus generally consist of a commercial type using a prescribed constant voltage device (not shown).

Figures 4A, 4B, 4C, 4D, 4E, 4F:
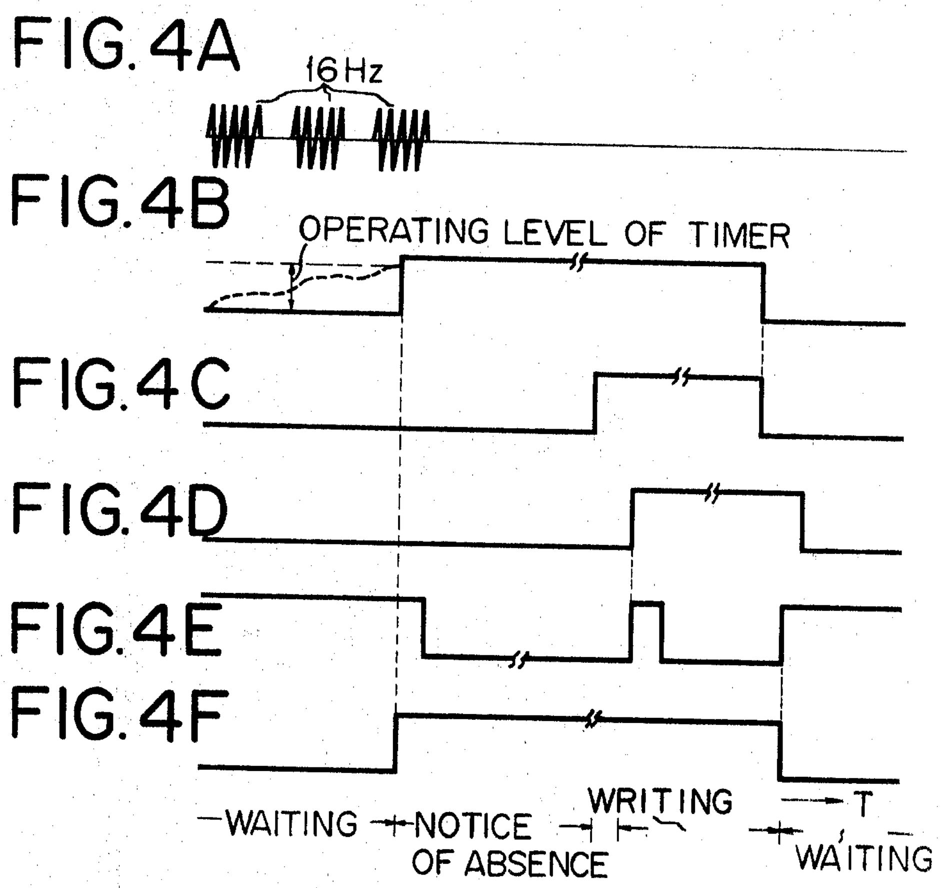
FIGS. 4A—F are a time chart indicating the operation of the control circuit of FIG. 3.

There will now be described the operation of FIGS. 1 to 3 by reference to the time charts of FIG. 4. FIGS. 4A, 4B, 4C, 4D, 4E and 4F respectively denote the time charts of the received signal, timer circuit, C relay, D relay, E relay and motor M.

Reference is first made to a normal case. When the automatic telephone answering apparatus is set in a waiting condition, light beams from the light source $LT_2$ of FIG. 2 are brought to a position to pass through the second rotation indicator 23B formed in the magnetic tape 22 and the second detector or phototransistor $PTr_2$ is turned on. Referring to FIG. 3, therefore, the base of the transistor $Tr_6$ has a higher potential than the emitter thereof due to the "ON" position of the phototransistor $PTr_2$, thus forming a loop of earth→E relay→transistor $Tr_6$→power source $-Vcc$ to actuate the E relay. The operation of this E relay allows its contacts $e_1$ and $e_2$ to make and its contact $e_3$to break. Since the magnetic tape 22 is not brought to a position to allow light beams from the light source $LT_2$ to pass through the first rotation indicator 23A of said tape 22, the phototransistor $PTr_1$ is not conducted. The transistor $Tr_3$ is not turned on though the contact $e_2$ is allowed to make, because its base is supplied with a negative voltage from the power source $-Vcc$ through the resistors $R_6$ and $R_3$. Neither is the motor M driven by the break of the contact $e_3$. When, under such waiting condition, there arrives a calling signal of 16 Hz. as shown in FIG. 4A, the received signal passes through a loop of telephone line $L_1$→set switch $S_2$→diode bridge and A relay→condenser $C_1$→telephone line $L_2$ so as to energize the A relay. The actuation of the A relay causes its contact $a$ to make, thus closing a loop of ground→parallel circuit of resistor $R_1$ and condenser $C_2$→variable resistor VR→contact $a$ of A relay→contact $e_1$ of E relay (which is set to make under the waiting condition)→power source$-Vcc$. Accordingly, the condenser $C_2$ connected to the base of the transistor $Tr_1$ is charged at a time constant determined by the resistor $R_1$, said condenser $C_2$ and variable resistor VR. There is interposed between the emitter of transistor $Tr_1$ and the ground a constant voltage diode ZD such as a zener diode so as to allow for prevention of erroneous actions the transistor $Tr_1$ to be operated when signals are received a prescribed number of times. Said constant voltage diode ZD operates in such a manner that the charge voltage of the condenser $C_2$ progressively rises as shown by the dotted line of FIG. 4B, and that when said charge voltage reaches the level at which the timer circuit 30 is energized the transistor $Tr_1$ is turned on. When signals of 16 Hz. are received less than a prescribed number of times (twice as shown), the transistor $Tr_1$ is not turned on, thus preventing the occurrence of erroneous actions. The operating level of the transistor $Tr_1$ can be determined either by varying the value of resistance offered by the variable resistor VR or by the operating voltage of the constant voltage diode ZD. When the transistor $Tr_1$ is turned on upon receipt of signals from a caller, the base of the transistor $Tr_2$ has a higher potential than the emitter thereof. Since the $LT_2$ is switched on, the source voltage is divided by the resistance of the light source $LT_2$ and resistor $R_7$ so that there is supplied a bias voltage across the base and emitter of the transistor $Tr_8$ to conduct the transistor $Tr_8$. When, therefore, the base of the transistor $Tr_2$ has a higher potential than the emitter thereof the B relay is energized through a loop of ground→resistor $R_{12}$→transistor $Tr_8$→B relay→transistor $Tr_2$→power source $-Vcc$. The operation of the B relay allows its contacts $b_1$, $b_2$, $b_3$ and $b_4$ to make. Since the contact $b_1$ is switched to a make contact, the primary winding $p$ of the transformer T is connected to the telephone lines $L_1$ and $L_2$ to form a DC loop, thus rendering said telephone lines available for communication. The contact $b_2$ causes the B relay to hold itself. Further, the making of the contact $b_4$ drives the motor M to allow the magnetic tape to travel. As apparent from FIG. 2, the second rotation indicator moves in the direction of the arrow, and light beams from the light source $LT_2$ are shut off by the magnetic tape 22 and the second phototransistor $PTr_2$ of FIG. 3 is turned off to release the E relay. Referring to FIG. 1, there is already recorded the absent called subscriber's message in the first track of the magnetic tape 22 which has begun to run, so that said message is reproduced by the fixed magnetic head 19 and the reproduced output is transmitted to the calling subscriber through a loop of fixed magnetic head 19→contacts $f_3$–$d_1$ and $c_1$ of the third switching circuit 18→ contact $s_{4\text{-}4}$ of the second switching circuit 17→input terminal 2 and output terminal 2′ of amplifier 14→contact $g_4$ of the first switching circuit 15→secondary winding $s$ of transformer T primary winding $p$ of said transformer T→telephone line 11. When the magnetic tape keeps on travelling to complete the absent called subscriber's message there is given forth a beep tone by the beep tone generator 16. Thus the called subscriber's telephone apparatus is gradually changed to a ready state to record the caller's information. According to the aforementioned embodiment, when the endless magnetic tape 22 makes one rotation, the message is brought to an end and the caller's information is recorded at the following rotation of said tape. A preparatory condition for recording starts from the point at which light beams from the light source $LT_2$ of FIG. 3 pass through the first rotation indicator 23A and the first detector or phototransistor $PTr_1$ is turned on. When this transistor $PTr_1$ is energized the potential of its collector is raised and supplied through resistors $R_3$ and $R_4$ to the base of the transistors $Tr_3$ and $Tr_4$ respectively. Since the E relay is not yet actuated, the collector circuit of the transistor $Tr_3$ is still left open and does not operate at all. On the other hand, the transistor $Tr_4$ is turned on, because its base potential is increased. The actuation of said transistor $Tr_4$ results in the formation of a loop of ground→transistor $Tr_4$→contact $d_5$ of D relay→C relay→power source $-Vcc$ to energize the C relay or a control relay, as shown in FIG. 4C. Said C relay carries out self-holding by the contact $b_3$ of the B relay, which already keep on operating, and the contact $c_4$.

When, under such condition, the magnetic tape travels further, light beams from the light source $LT_2$ are no longer projected on the first phototransistor $PTr_1$, so that said transistor is turned off. The turnoff of said phototransistor $PTr_1$ leads to the decreased potential of its collector and the turnoff of the transistor $Tr_4$, whereas the C relay or a control relay keeps on operating due to its self-holding. Accordingly, the contact $c_5$ makes to turn on the transistor $Tr_5$. The turn on of the transistor $Tr_5$ actuates the D relay as shown in FIG. 4D through a loop of earth→contact $c_5$ of C relay→transistor $Tr_5$→contact $d_6$ of D relay→D relay as a control relay→power source $-Vcc$. The operation of the D relay actuates its contacts $d_1$, $d_2$, $d_4$, $d_5$ and $d_6$. At this time the self-holding circuit of the C relay is released by the contact $d_5$ of the D relay. However, since the C relay is a slow release relay, it is not readily released, but continues its self-holding condition through a loop of ground→contact $c_5$ of C relay→transistor $Tr_5$→contact $d_5$ of D relay→C relay→power source $-Vcc$. On the other hand the D relay is actuated through a loop of ground→contact $b_3$ of B relay→contact $c_4$of C relay→contact $d_6$ of D relay→D relay→power source $-Vcc$. Then the magnetic tape 22 travels to energize the second phototransistor $PTr_2$ corresponding to the second rotation indicator 23B. In this case, the transistor $Tr_6$ is turned on and only the E relay is energized as shown in FIG. 4E, so that the other parts of the control circuit are not affected at all. The operation of C and D relays, or control relays, causes the contacts $c_1$ and $d_1$ of the third switching circuit 18 of FIG. 1 to break and the contacts $c_2$ and $d_2$ thereof to make, bringing the movable magnetic head 20 to an operable state. Namely, upon receipt of a calling subscriber's intelligence there is formed a loop of primary winding $p$ of transformer T→tertiary winding $t$ thereof→input terminal 1 and output terminal 1′ of amplifier 14→contacts $c_2$, $d_2$ and $S_{4\text{-}3}$ of the third switching circuit→ movable magnetic head 20. The operation of the control relay actuates the driving mechanism 21 of the movable magnetic head 20, to bring said magnetic head 20 to the position of the second track of the magnetic tape 22. The driving mechanism 21 consists of the known plunger mechanism and description thereof is omitted. It will be apparent that the movable magnetic head 20, which is switched to writing or reading-out as need arises, is normally set for writing. Accordingly, the caller's information is recorded in the second or following track of the magnetic tape 22. Also in this case, the aforesaid embodiment uses one rotation of one track in recording the caller's information each time signals arrive from said subscriber's telephone apparatus. However, it is not always necessary to do so. Accordingly, operation after completion of the second rotation of the magnetic tape 22 will run as follows. While the magnetic tape 22 is travelling, light beams from light source $LT_2$ are shutoff by said tape 22. When the first rotation indicator 23A is brought to a position to allow light beams from the light source $LT_2$ to pass there through, the phototransistor $PTr_1$ corresponding to the first rotation indicator 23A is turned on. Its operation causes its collector to have an increased potential. The potential thus increased is impressed on the base of the transistor $Tr_5$ through the resistor $R_5$ to turn it off and release the C relay as shown in FIG. 4C. At the time the C relay is released, the D relay still continues operation to allow the base of the transistor $Tr_2$ to decrease in potential through a loop of power source $-Vcc$→ contact $c_3$ of C relay→contact $d_4$ of D relay base of transistor $Tr_2$ and the current running through said transistor $Tr_2$ is reduced to below the level of operating current of the B relay. Since, therefore, the B relay is released to cause its contact $b_2$ to break, the self-holding circuit of the B relay of the transistor $Tr_2$ is opened. When the C relay is released, the D relay is released in turn. However, since the E relay is not energized yet, the motor M still keeps on running as shown in FIG. 4F to allow the magnetic tape 22 to continue its travel. Said travel of the magnetic tape 22 turns off the first phototransistor $PTr_1$ disposed in a manner to face the first rotation indicator 23A. When the travelling magnetic tape 22 is brought to a point to allow light beams from the light source $LT_2$ to pass through the second rotation indicator 23B, the collector of the second phototransistor $PTr_2$ has an increased potential to energize the E relay to stop the motor M by its contact $e_3$. The contacts $c_1$ and $d_1$ of the C and D relays respectively involved in the third switching circuit 18 of FIG. 1 are allowed to make, because the C and D relays of the control circuit 13 are released, thus bringing again the automatic response telephone apparatus to a waiting condition. At this time, the movable magnetic head 20 stops at the second track of the magnetic tape 22 and, when a recording is made next time, is brought down by the driving mechanism 21 to cause said recording to be performed in the third track. The movable magnetic head 20 is brought forward by steps. When said head 20 reaches the last track this is detected so as to prevent the automatic telephone answering apparatus from operating any longer. The aforementioned operation will be more clearly understood by reference to the time chart of FIG. 4. Namely, the recorded reply in the first track of the endless magnetic tape is communicated to the caller at the first rotation of said tape. At this time, information for starting the tape is originally formed by the E relay, and when the B relay begins to be energized the motor is driven to allow the magnetic tape to travel. Upon completion of the first rotation of said tape, the E and C relays are actuated and after a prescribed length of time (after the first rotation indicator passes the light source) the E relay is released, whereas the D relay is energized. The operation of the D relay causes the movable magnetic head 20 to be shifted to the second track of the magnetic tape so as to write the caller's information. Upon completion of the second track of the magnetic tape, the C relay is actuated to release the B relay and energize the E relay and then release the D relay, bringing again the automatic response telephone apparatus to a waiting condition.

Where the caller's information is to be reproduced, the reproducing switch $S_{4\text{-}1}$ of FIG. 3 makes to drive the motor M. Referring to FIG. 1, the reproducing switch $S_{4\text{-}3}$ of the third switching circuit 18 and the reproducing switch $S_{4\text{-}2}$ of the first switching circuit 15 are switched to change the telephone apparatus into a reproducing setup. The movable magnetic head 20 is converted to use in reproduction. The aforesaid calling subscriber's intelligence is reproduced through a loop of movable magnetic head→reproducing switch $S_{4-3}$ of third switching circuit 18→input terminal 4 and output terminal 4' of amplifier 14→switch $S_{4-2}$ of first switching circuit 15→speaker SP. In the case of reproduction, the C and D relays or control relays remain unrelated thereto. The driving mechanism 21 is operated to allow the caller's message recorded in the second and subsequent tracks of the magnetic tape to be reproduced in turn from the movable magnetic head.

There will now be described the case where the subject telephone apparatus is so operated as to exclusively give the reply without recording the caller's information. In this case, the receiving circuit, switch $S_{3-1}$ for exclusively giving the recorded reply and another switch $S_{3-2}$ for similar purpose involved in a control circuit connected to the base of the transistor $Tr_2$ are allowed to make, thus converting the subject telephone apparatus to use only in giving the absent called subscriber's message. The process of operation whereby prescribed signals from the caller are received, the B relay is actuated to drive the motor so as to allow the magnetic tape to travel and the recorded reply recorded in the first track of the magnetic tape is communicated to the caller is the same as in the preceding case and description thereof is omitted. Upon completion of the recorded reply, light beams from the light source $LT_2$ are brought to a position to pass through the first rotation indicator 23A, with the resultant turn on of the first phototransistor $PTr_1$ and in sequence the transistor $Tr_4$ to energize the C relay. Thus the current of the transistor $Tr_2$ is reduced by the contact $c_3$ of the C relay to below the level of operating current of the B relay to release it through a loop of power source $-Vcc$→contact $c_3$ of C relay→exclusive switch $S_{3-2}$ for giving notice of absence→contact $d_4$of D relay→base circuit of transistor $Tr_2$. Further, the travel of the magnetic tape 22 energizes the D relay and when light beams from the light source $LT_2$are brought to a position to pass through the second rotation indicator 23B then the second phototransistor $PTr_2$ is turned on to actuate the E relay and in consequence both C and D relays. The operation of the E relay and the release of the B relay stop the motor M, so that the subject telephone apparatus is released and brought to a waiting condition ready for the subsequent arrival of signals from a caller. As mentioned above, the apparatus of the present invention performs the function of exclusively giving the recorded reply without using any particular control circuit.

There will now be described the mechanism whereby the recorded reply is recorded in the first track of the magnetic tape and the recorded message is monitored by the owner of the automatic telephone answering apparatus. Referring to FIG. 3, the F relay is a control relay for recording and the G relay is a control relay for monitoring. These control relays are stated by a recording switch $S_{5-1}$ and monitoring switch $S_{6-1}$ respectively. In the case of recording, the recording switch $S_{5-1}$ is turned on, to cause the F relay to operate through a loop of each→resistor $R_{12}$→transistor $Tr_8$→contact $c_6$ of C relay→F relay→recording switch $S_{5-1}$→power source $-Vcc$. The operation of the F relay allows its contact $f_2$ to make so as to drive the motor M. Further, the relay contact $f_4$ of the second switching circuit 17 of FIG. 1 and the relay contact $f_3$of the third switching circuit 18 form a recording setup through a loop of microphone MIC→contact $f_4$ of record switching circuit 17→input terminal 3 and output terminal 3' of amplifier 14→contact $f_3$ of third switching circuit 18→fixed magnetic head 19. When the travel of the magnetic tape 22 allows light beams from the light source $LT_2$ to be brought to a position to pass through the first rotation indicator 23A, the first phototransistor $PTr_1$ is turned on to actuate the C relay so as to break its contact $c_6$and release the F relay so as to break its contact $f_2$, so that the motor M is stopped to bring recording to an end. In this case the F relay consists of a slow release relay and light beams from the light source $LT_2$ pass through the second rotation indicator 23B to turn on the second phototransistor $PTr_2$ and actuate the E relay, so that the magnetic tape is stopped under a waiting condition. Where the recorded reply is reproduced and monitored, the monitoring switch $S_{6-1}$ is turned on, operated and released in the same manner as the F relay used in recording. Referring to FIG. 1, the contact $g_4$ of the first switching circuit 15 and the contact $g_3$ of the third switching circuit 18 are allowed to make, so that the monitoring setup is formed from a loop of fixed magnetic head 19→contacts $g_3$, $c_1$and $d_1$ of third switching circuit 18→contact $S_{4-4}$ of second switching circuit 17→input terminal 2 and output terminal 2' of amplifier 14→contact $g_4$ of first switching circuit 15→speaker SP. Of course, the switching of the fixed magnetic head 19 to recording or reproduction (monitoring) is controlled by the F and G relays (not shown).

Description has been made of the normal function of the subject telephone apparatus, that is, communication of the recorded reply, reproduction of the caller's information, recording of said recorded reply and monitoring of the recorded reply. There will now be further described other functions of the present invention such, for example, as protection of the telephone apparatus by taking automatic remedial measures in the case of occurrence of abnormalities.

Let it be assumed that a magnetic tape is broken, or improperly positioned. In such case, the two phototransistors $PTr_1$ and $PTr_2$ are turned on at the same time. The operation of the second phototransistor $PTr_2$ actuates the E relay and the operation of the first phototransistor $PTr_1$ allows the base of the transistor $Tr_3$ to have an elevated potential to turn it on, so that the occurrence of any abnormality is indicated by the indication lamp $LT_1$ through a loop of ground indication lamp $LT_1$→contact $e_2$ of E relay→transistor $Tr_3$→power source $-Vcc$. Also the base of the transistor $Tr_2$ is reduced in potential through a loop of base of transistor $Tr_2$→diode $D_6$→contact $e_2$ of E relay→transistor $Tr_3$→power source $-Vcc$ to cause the current running through the transistor $Tr_2$ to fall to below the operating current of the B relay so that said relay is released and one $D_4$ of the bridge diodes breaks. Thus, in the case the magnetic tape is cut off, or assumes an improper position, the motor M is stopped and the indication lamp $LT_1$ is turned on.

There will now be described the case where the power source fails for some reason or other and power supply is restarted later. Such power source failure occurs, for example, when a commercial power source is used as such in the recording telephone apparatus through a constant voltage device. When the power source $-Vcc$ is cut off it is necessary that all the relays be released, and when the power source $-Vcc$ begins again to supply power it is required that the recording telephone apparatus be brought back to a waiting condition. When such event takes place while the magnetic tape is travelling the contact $e_3$ of the E relay remains closed, because said relay is not in an operating condition. Thus the motor M continues to be driven to bring the second rotation indicator 23B of the magnetic tape 22 to a position to allow light beams from the light source $LT_2$ to pass through said indicator 23B with the resultant turn on of the second phototransistor $PTr_2$. Then the E relay is energized to stop the motor M, bringing again the apparatus to a waiting condition.

There is now made reference to a protective circuit. When the lamp of the light source $LT_2$ is cut off, the base of the transistor $Tr_8$is not supplied with a negative voltage by the power source $-Vcc$, so that said transistor $Tr_8$ is turned off to prevent the relays except for the E relay from being energized. On the other hand, the base of the transistor $Tr_7$ is supplied with a negative voltage by the power source $-Vcc$ through the resistor $R_{11}$ to turn on said transistor $Tr_7$. Accordingly, the E relay operates through a loop of ground→E relay→transistor $Tr_7$→power source $-Vcc$ so as to cause its contact $e_3$ to break and the motor M to be stopped. In case another indication lamp $LT_2$ fails, the E relay is energized to stop the motor M as in the preceding case. If, under such condition, the transistor $Tr_3$ is in an "ON" state, the timer circuit of the transistor $Tr_1$ is actuated on arrival of signals through a loop of ground→constant voltage diode ZD→transistor $Tr_1$→resistor $R_2$→diode $D_6$→contact $e_2$of E relay→transistor $Tr_3$→power source $-Vcc$.

However, the transistor $Tr_2$ does not receive enough current to actuate the B relay so that the motor M remains stopped. Accordingly, the telephone apparatus of the present invention is effectively protected in any case by the aforementioned protective circuit arrangement.

Figure 5:
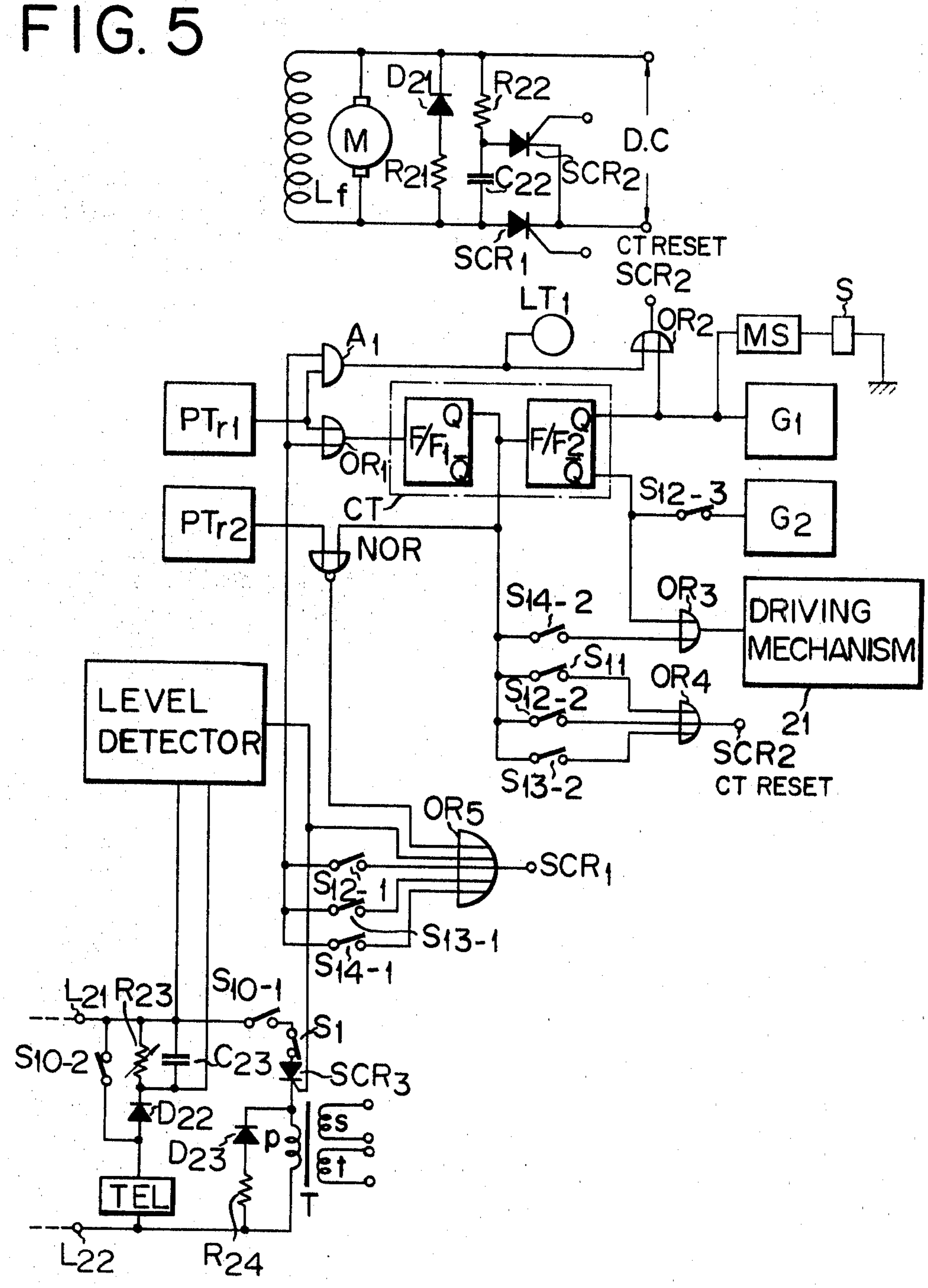
FIG. 5 presents another embodiment of the control circuit of FIG. 2.

There will now be described another embodiment of the present invention by reference to FIG. 5. The control device is formed of a logic circuit and the motor consists of a DC shunt type. According to this figure, the motor is started by a first silicon controlled rectifier $SCR_1$ and stopped by a second silicon controlled rectifier $SCR_2$, the circuit associated therewith being already known. When the gate of the first silicon controlled rectifier $SCR_1$ is supplied with a trigger signal, said rectifier is turned on to start the motor by introduction of current through the field winding $Lf$ and armature winding (not shown). At this time a commutation condenser $C_{22}$ is charged with current flowing through a resistor $R_{22}$. Next when the gate of the second silicon controlled rectifier $SCR_2$ is similarly supplied with a trigger signal, said rectifier is turned on to allow the commutation condenser $C_{22}$ to start discharges and the first silicon controlled rectifier $SCR_1$ is turned off. Since current from the power source now runs through the resistor $R_{22}$ and the second silicon controlled rectifier $SCR_2$, the motor stops. A serial circuit of a resistor 21 and diode $D_{21}$ which is connected parallel to the field winding $Lf$ and armature winding (not shown) is intended to absorb the magnetic energy accumulated in the field winding $Lf$ and armature winding when the motor stops. When the gate of the first silicon controlled rectifier $SCR_1$ is again supplied with a trigger signal to start the motor, said rectifier is turned on to allow the second silicon controlled rectifier $SCR_2$ to be turned off by the action of the commutation condenser $C_{22}$.

Figure 6A:
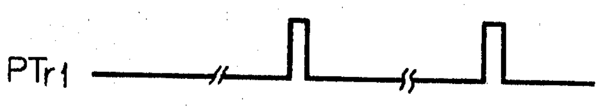
FIGS. 6A—E are a time chart illustrating the operation of the control circuit of FIG. 5.
Figure 6B:
Figure 6C:
Figure 6D:
Figure 6E:
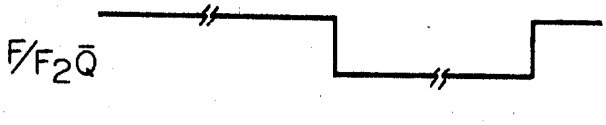

There will now be described the operation of the control circuit by reference to FIGS. 5 and 6. To set the automatic response telephone apparatus, there is pushed a set switch $S_{10}$of the control circuit. The pushing of this set switch $S_{10}$causes the contact $S_{10\text{-}1}$ to make and the contacts $S_{10\text{-}2}$ to break. When, therefore, there arrives a calling signal of 16 Hz. to the telephone lines $L_{21}$ and $L_{22}$, it is rectified by a diode $D_{22}$ to generate a voltage in the resistor $R_{23}$ and the timer circuit of a condenser $C_{23}$. The resistor $R_{23}$ consists of a variable type so as to be set at a prescribed time constant. The voltage of the timer circuit is supplied to a level detector LD. This detector LD performs substantially the same function as the circuit of the transistor $Tr_1$ of FIG. 3. When calling signals arrive a prescribed number of times, there is energized the level detector LD. Output signals from the level detector LD are supplied as trigger signals to the gate of the first silicon controlled rectifier $SCR_1$ through an $OR_5$ gate to start the motor. The output signal is branched off, and the branched portion thereof forms a trigger signal to energize the third silicon controlled rectifier $SCR_3$ of the receiving circuit. Accordingly, the telephone lines are brought to a state permitting communication, and capable of sending and receiving signals through a pickup transformer T. When the motor is started to allow the magnetic tape to travel, the phototransistor $PTr_1$of the first detector, and in sequence the phototransistor $PTr_2$ of the second detector are energized. The operation of these phototransistors leads to the generation of pulses as shown in FIGS. 6A and 6B. These pulses are successively supplied to a counter CT through an OR gate $OR_1$. This counter is a quarternary counter consisting of a first flip-flop circuit $F/F_1$ and a second flip-flop circuit $F/F_2$. The output Q from the first flip-flop circuit $F/F_1$ operates by the leading of the trigger signal for the $OR_1$ gate. The second flip-flop circuit $F/F_2$ uses the leading of the output Q from the first flip-flop circuit $F/F_1$as a trigger signal. The outputs Q and $\overline{Q}$ from the first and second flip-flop circuits respectively assume the forms as indicated by FIGS. 6D and 6E. The output $\overline{Q}$ from the second flip-flop circuit $F/F_2$is supplied to a readout gate $G_2$ through a contact $S_{12\text{-}3}$3. This gate $G_2$ may consist of an element similar to the switching transistor of the first embodiment or a transistor amplifier which normally remains in a nonconductive state, but upon receipt of a gate signal assumes an activated state. The gate $G_2$ acts in the same manner as the contacts $C_1$ and $D_1$ of FIG. 1, and is tended, when it is opened, to transmit to the amplifier 14 signals read out from the endless magnetic tape 22 which represent the absent called subscriber's message. The trailing edge of the output signal $Q$ from the second flip-flop circuit $F/F_2$ is supplied to the driving mechanism 21 through an $OR_3$ gate. This driving mechanism 21 shifts the movable magnetic head 20 to a prescribed track formed in the endless magnetic tape 22 by means of the aforesaid trailing edge of the signal. The output Q of the second flip-flop circuit $F/F_2$ is supplied to a writing gate $G_1$. This gate $G_1$ acts in the same manner as the relay contacts $c_2$ and $d_2$ of FIG. 1 and is intended, when it is opened, to transfer a calling subscriber's intelligence to the endless magnetic tape 22 through the movable magnetic head 20. The trailing edge of the output signal Q from the second flip-flop circuit $F/F_2$ is supplied to the reset terminal (not shown) of counter CT and the gate of the second silicon controlled rectifier $SCR_2$ through an OR gate $OR_2$. Accordingly, when the magnetic tape 22 makes a second rotation the counter CT is reset and the motor stops. At the same time, the trailing edge of the output Q is supplied to a monostable multivibrator MS. The output signal of the multivibrator MS causes an S relay to operate during the prescribed period. Therefore, the third silicon controlled rectifier is turned off by the contact $S_1$ of the S relay.

When the subject telephone apparatus is converted to only giving a recorded reply, there is pushed a switch $S_{11}$. This causes the output Q from the first flip-flop circuit $F/F_1$ to be supplied to the reset terminal of counter CT and the gate of the second silicon controlled rectifier $SCR_2$ through the aforesaid absence-notifying switch $S_{11}$ and $OR_4$ gate. In this case the motor stops and the counter CT is reset at every rotation of the magnetic tape 22.

There will now be described the case were there is a written a recorded reply in the first track of the endless magnetic tape 22. When there is pushed a switch $S_{12}$, its contact $S_{12\text{-}1}$ allows the signal of the second phototransistor $PTr_2$ to be supplied to the first silicon controlled rectifier $SCR_1$through an $OR_5$ gate with the resultant rotation of the motor. When the endless magnetic tape 22 makes a rotation the output Q of the first flip-flop circuit $F/F_1$ is supplied to the reset terminal of counter CT and the gate of the second silicon controlled rectifier $SCR_2$ through the $OR_4$ gate to stop the motor. If, therefore, the contacts of the switch $S_{12}$ are so formed as to act in the same manner as the relay contacts $f_3$ and $f_4$ of FIG. 1, then the vocal signals of the microphone MIC will be amplified by the amplifier 14 and written in the first track of the endless magnetic tape 22 from the fixed magnetic head 19.

Where the recorded reply is to be read out and monitored there is pushed a switch $S_{13}$. Then its contacts $S_{13\text{-}1}$ and $S_{13\text{-}2}$ control the rotation of the motor as in the preceding case. If, therefore, the contacts of the switch $S_{13}$ are so formed as to act in the same manner as the relay contacts $g_3$ and $g_4$ of FIG. 1, then it will be possible to read out from the fixed magnetic head 19 the absent called subscriber's message recorded in the first track of the endless magnetic tape 22.

When it is desired to read out the caller's information recorded in the second and following tracks of the endless magnetic tape 22, it is only required to push a switch $S_{14}$. This closes its contact $S_{14\text{-}1}$ to form a trigger signal for the first silicon controlled rectifier $SCR_1$ with the resultant rotation of the motor. Also the closing of the contact $S_{14\text{-}2}$ of switch $S_{14}$ allows the output Q from the first flip-flop circuit $F/F_1$ to be supplied to the driving mechanism 21 through the $OR_3$ gate, each time the endless magnetic tape 22 makes a rotation. Thus the driving mechanism 21 transfers the movable magnetic head 20 to other tracks of the magnetic tape 22 for each of its rotations. If, therefore, the contacts of a switch $S_{14}$ are so formed as to act in the same manner as the contacts $S_{4\text{-}3}$ and $S_{4\text{-}4}$ of FIG. 1, then it will be possible to read out from the movable magnetic head 20 the caller information recorded in the second and following tracks of the endless magnetic tape 22.

There will now be described the protective function of the automatic telephone answering apparatus of the present invention when there occur difficulties therein. For example, if the magnetic tape is broken, or improperly positioned, the first and second phototransistors $PTr_1$ and $PTr_2$ will be energized at the same time. Since both phototransistors $PTr_1$ and $PTr_2$ are connected to an AND gate $A_1$, there are generated pulses from said AND gate $A_1$. The pulse turns on the indication lamp $LT_1$ and also acts as a trigger signal for the gate of the second silicon controlled rectifier $SCR_2$ to stop the motor.

When the subject telephone apparatus is in a waiting condition, the second detector should, as described in the first embodiment, be aligned with the second rotation indicator 23B of the endless magnetic tape 22. If there is no such alignment, the signal from the second phototransistor $PTr_2$ and output Q from the first flip-flop circuit $F/F_1$ are supplied to a NOR gate. Thus there is supplied a trigger signal from the NOR gate through the $OR_5$ gate to the gate of the first silicon controlled rectifier $SCR_1$. Accordingly, the motor keeps on rotating until there is restored a proper waiting condition.

It will be apparent that in addition to the aforementioned embodiments, the present invention also includes modifications thereof, for example, those in which the rotation indicator consists of a conductive foil and the detector is provided with the corresponding switching means or in which there are provided three or more rotation indicators and detectors respectively.

As mentioned above, the automatic telephone answering apparatus of the present invention is of extremely simple arrangement and not only has a perfect function as such but also is provided with various automatic fail safe means in case there occurs any abnormality, so that it has a high reliability and permits efficient communication.

We claim:

1. An automatic telephone answering apparatus comprising a receiving circuit connected to telephone lines for detecting received signals, a signal sending and receiving circuit for picking up a caller's information arriving through the telephone lines and giving forth the recorded reply, a magnetic recording and reproducing device for writing the information in a magnetic recording medium and reading out said information therefrom and a control device for controlling the aforesaid various operations, wherein said magnetic recording and reproducing devices consist of 1. an amplifier for amplifying signals representing the caller's information an those representing the recorded reply,
2. a movable magnetic head for writing which generates magnetic flux according to the signals representing the caller's information which were amplified by said amplifier,
3. an endless magnetic recording medium for allowing the recorded reply to be written in a prescribed track and the caller's information to be written in other tracks by said movable magnetic head,
4. a fixed magnetic head for reading out the recorded reply recorded in the prescribed track of said endless magnetic recording medium,
5. a first rotation indicator and a second rotation indicator formed in the endless magnetic recording medium at a prescribed interval so as to detect its rotation,
6. a driving mechanism for shifting the movable magnetic head to the other tracks of the endless magnetic recording medium than the prescribed track when said medium completes a prescribed rotation, and
7. a motor for rotating the endless magnetic recording medium; and said control devices consists of 1. a first detector and a second detector and a second detector so disposed as to face the first and second rotation indicators respectively of the endless magnetic recording medium and detect the rotation of said medium and form control signals, and
2. a control circuit for controlling rotating of the motor to cause the second detector to be aligned with the second rotation indicator when the automatic telephone answering apparatus is not in a waiting condition and allowing the motor naturally to cease to run when said apparatus is brought back to such waiting condition, and starting the motor upon arrival of signals and stopping the motor when the first and second detectors operate successively, thus resulting in the completion of a prescribed rotation of the magnetic medium.

2 The telephone apparatus according to claim 1 wherein the control circuit comprises 1. a counter operated by outputs from the first and second detectors,
2. at least two semiconductors provided with a control electrode for starting or stopping the motor according to the outputs from said counter or its condition, that of said semiconductors which is used in starting the motor being supplied with a trigger signal from the receiving circuit,
3. a circuit for forming a trigger signal for the semiconductors provided with a control electrode according to outputs from said counter or its condition and outputs from the first or second detector in order to adjust the tape to the predetermined waiting position by controlling the operation of the motor, and
4. a readout gate and writing gate controlled according to outputs from said counter or its condition.

3. The telephone apparatus according to claim 1 wherein the receiving circuit arrangement involves a timer circuit for detecting received signals and the magnetic recording and reproducing device comprises 1. a magnetic recording medium consisting of an endless magnetic tape, and
2. a first and second rotation indicator provided with a window to allow the passage of flight: and the control device is formed of 1. a first and second detector comprising a light source and a first and second photoelectric element respectively, and
2. a control circuit involving
   a. a level detector energized when outputs from the timer circuit reach a prescribed level,
   b. a counter actuated by outputs from the first and second detectors,
   c. at least two semiconductors provided with a control electrode for starting or stopping the motor according to outputs from said counter or its condition, that of said semiconductors which is used in starting the motor being supplied with a trigger signal from the level detector,
   d. a circuit for forming a trigger signal for the semiconductors provided with a control electrode according to outputs from said counter or its condition and outputs from the first or second detector in order to adjust the tape to the predetermined waiting position by controlling the operation of the motor, and
   e. a readout gate and writing gate controlled according to outputs from said counter or its condition.

4. The telephone apparatus according to claim 3 wherein the first and second photoelectric elements of the control circuit consist of a first and second phototransistor respectively.

5. The telephone apparatus according to claim 3 wherein the control device further comprises an abnormal indicator energized when there are issued outputs from the first and second detectors at the same time and a circuit for supplying a trigger signal to a semiconductor provided with a control electrode for stopping the motor in such case.

6. The telephone apparatus according to claim 3 wherein the semiconductor provided with a control electrode consists of a silicon controlled rectifier.

7. The telephone apparatus according to claim 1 wherein the receiving circuit involves a relay circuit for detecting signals wherein the magnetic recording and reproducing device comprises 1. a magnetic recording medium consisting of an endless magnetic tape, and
2. a first and second rotation indicator provided with a window to allow the passage of light; and the control device comprises
1. a first and second detector consisting of a light source and a first and second photoelectric element, and
2. a control circuit involving
   a. a first circuit which actuates the power source of the motor according to the action of the relay circuit of the receiving circuit arrangement and cuts off the power source of the motor when the endless magnetic tape completes a prescribed rotation,
   b. a second circuit for cutting off the power source of the motor by the trigger signal which the second photoelectric element generates when the light from the light source passes through the window of the second rotation indicator, and
   c. a third circuit for memorizing the completion of the prescribed rotation of the endless magnetic tape from the trigger signals generated by the first and second photoelectric elements, directing signals representing the calling subscriber's intelligence to be written in the specified track of the endless magnetic tape and informing the first circuit of the completion of the prescribed rotation of said tape.

8. The telephone apparatus according to claim 7 which is so designed that
1. the first and second photoelectric elements consist of first and second phototransistors $PTr_1$ and $PTr_2$ respectively,
2. the first circuit comprises a transistor $Tr_2$ controlled by the trigger signal generated by the first phototransistor $PTr_1$ and a master control B relay energized by said transistor $Tr_2$,
3. the second circuit involves a transistor $Tr_6$ and a setting E relay actuated by said transistor $Tr_6$, and
4. the third circuit is formed of a first transistor $Tr_4$ controlled by the trigger signal generated by the first phototransistor $PTr_1$, a first control C relay energized by said first transistor $Tr_4$, a second transistor $Tr_5$ controlled by the first phototransistor $PTr_1$ and a second control D relay actuated by said second transistor $Tr_5$, wherein the first C relay is held by a serial circuit consisting of the respective contacts $c_5$ and $d_5$ of the C relay itself and the D relay during the operation of the transistor $Tr_5$, and the second D relay is held by a serial circuit consisting of the respective contacts $d_6$, $c_1$ and $b_3$ of the D relay itself, C relay and the master control B relay.

9. The telephone apparatus according to claim 7 further comprising an abnormal indicator $LT_1$ which is actuated when the first and second detectors are energized at the same time.

10. The telephone apparatus according to claim 7 wherein the control circuit further comprises a timer circuit for determining the arrival of signals when the relay circuit of the receiving circuit arrangement operated a prescribed number of times and actuating the power source by the resultant output.

11. The telephone apparatus according to claim 10 further comprising an indicator $LT_1$ which is actuated when the first and second detectors are energized at the same time.

12. The telephone apparatus according to claim 10 which is so designed that
1. the first and second photoelectric elements consist of first and second phototransistors $PTr_1$ and $PTr_2$ respectively,
2. the first circuit comprises a transistor $Tr_2$ controlled by the trigger signal generated by the first phototransistor $PTr_1$ and a master control B relay energized by said transistor $Tr_2$,
3. the second circuit involves a transistor $Tr_6$ and a setting E relay actuated by said transistor $Tr_6$, and
4. the third circuit is formed of a first transistor $Tr_4$ controlled by the trigger signal generated by the first phototransistor $PTr_1$, a first control C relay energized by said first phototransistor $PTr_1$, a second transistor $Tr_5$ controlled by the first phototransistor $PTr_1$ and the second control D relay actuated by said second transistor $Dr_5$, wherein the first C relay is held by a serial circuit consisting of the respective contacts $c_5$ and $d_5$ of the C relay itself and the D relay during the operation of the transistor $Tr_5$, and the second D relay is held by a serial circuit consisting of the respective contacts $d_6$, $c_1$ and $b_3$ of the D relay itself, C relay and the master control B relay.

13. The telephone apparatus according to claim 12 comprising an indicator which is actuated when the first and second detectors are energized at the same time.